United States Patent
Stege

(10) Patent No.: US 10,112,322 B2
(45) Date of Patent: Oct. 30, 2018

(54) NEGATIVE MOLD COMPRISING PREDEFINED FOAM BLOCKS FOR CASTING A COMPONENT AND METHOD FOR PRODUCING THE NEGATIVE MOLD

(71) Applicant: SIEMENS AKTIENGESELLSCHAFT, München (DE)

(72) Inventor: Jason Stege, Brande (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 319 days.

(21) Appl. No.: 15/132,338

(22) Filed: Apr. 19, 2016

(65) Prior Publication Data

US 2016/0303770 A1    Oct. 20, 2016

Related U.S. Application Data

(62) Division of application No. 13/171,785, filed on Jun. 29, 2011, now Pat. No. 9,346,193.

(30) Foreign Application Priority Data

Jul. 14, 2010 (EP) .................................... 10007254

(51) Int. Cl.
*B29C 33/30* (2006.01)
*B29C 33/38* (2006.01)
(Continued)

(52) U.S. Cl.
CPC .......... *B29C 33/302* (2013.01); *B29C 33/301* (2013.01); *B29C 33/3814* (2013.01);
(Continued)

(58) Field of Classification Search
CPC . B29C 33/301; B29C 33/302; B29C 33/3814; B29L 2031/082; B29L 2031/085; B29L 2031/757; B29K 2023/12
See application file for complete search history.

(56) References Cited

U.S. PATENT DOCUMENTS 2,679,172 A * 5/1954 Clevenger .............. B21D 37/20
                                                      72/362
5,707,477 A * 1/1998 Cloud ...................... B22C 7/00
                                                      156/292
(Continued)

FOREIGN PATENT DOCUMENTS

EP       0662380 A2 *  7/1995 ......... B29C 33/3842
EP       0901849 A1 *  3/1999 ............... B22C 7/00
WO    WO2006/024676    * 9/2006

OTHER PUBLICATIONS

"Tooling up for Large Wind Turbine Blades", George Marsh, ReinforcedPlastics.com, Oct. 1, 2007, 6 pages. (Year: 2007).*
(Continued)

*Primary Examiner* — Yogendra N Gupta
*Assistant Examiner* — Emmanuel S Luk

(57) ABSTRACT

A negative mold for casting a component such as a blade of a wind turbine is described. The negative mold includes a support structure and a plurality of foam blocks, which are mounted to the support structure in such a manner, that a common surface contour of the plurality of foam blocks defines an outer surface of the component, which is to be casted. Each foam block of the plurality of foam blocks is taken from a predetermined number of different types of foam blocks, each type of foam block is defined by a predetermined foam block size and foam block shape. A method for producing such a negative mold is also described.

20 Claims, 2 Drawing Sheets

(51) Int. Cl.
   *B29K 105/04* (2006.01)
   *B29L 31/08* (2006.01)
   *B29K 23/00* (2006.01)
   *B29K 675/00* (2006.01)
   *B29L 31/00* (2006.01)

(52) U.S. Cl.
   CPC ...... *B29K 2023/12* (2013.01); *B29K 2105/04* (2013.01); *B29K 2675/00* (2013.01); *B29L 2031/082* (2013.01); *B29L 2031/085* (2013.01); *B29L 2031/757* (2013.01)

(56) References Cited

U.S. PATENT DOCUMENTS

| | | | | |
|---|---|---|---|---|
| 6,415,640 | B1* | 7/2002 | Haussermann | B21D 37/02 72/350 |
| 6,564,852 | B1* | 5/2003 | Wendt | B22C 7/00 164/17 |
| 8,470,425 | B2* | 6/2013 | Day | B29C 70/086 416/223 R |
| 9,140,235 | B2* | 9/2015 | Vossler | B29C 33/308 |
| 2004/0013865 | A1* | 1/2004 | Kotnis | B22C 7/023 428/304.4 |
| 2005/0233023 | A1* | 10/2005 | Cleaver | B29C 33/40 425/223 |
| 2005/0249832 | A1* | 11/2005 | Kata | B23P 15/246 425/35 |
| 2005/0278928 | A1* | 12/2005 | Barlier | B23P 15/246 29/458 |
| 2007/0072981 | A1* | 3/2007 | Miller | B82Y 30/00 524/445 |
| 2008/0099955 | A1* | 5/2008 | Cleaver | B29C 33/565 264/219 |
| 2009/0062477 | A1* | 3/2009 | Cleaver | B29C 33/3842 525/374 |
| 2009/0084932 | A1* | 4/2009 | Livingston | B29C 33/38 249/114.1 |
| 2012/0056346 | A1* | 3/2012 | Maurer | B26D 3/006 264/48 |
| 2012/0211637 | A1* | 8/2012 | Christiansen | B29C 33/306 249/102 |
| 2014/0238097 | A1* | 8/2014 | Shuck | B23P 15/246 72/60 |
| 2016/0303771 | A1* | 10/2016 | Lepretre | B29D 30/0629 |
| 2017/0274563 | A1* | 9/2017 | De Waal Malefijt | B29C 33/3842 |

OTHER PUBLICATIONS

"Tooling Roundup", Compositesworld.com, Sep. 1, 2004, 10 pages. (Year: 2004).*

* cited by examiner

NEGATIVE MOLD COMPRISING PREDEFINED FOAM BLOCKS FOR CASTING A COMPONENT AND METHOD FOR PRODUCING THE NEGATIVE MOLD

CROSS REFERENCE TO RELATED APPLICATIONS

This application claims the benefit of U.S. patent application Ser. No. 13/171,785 filed Jun. 29, 2011, which claims the priority of European Patent Office application No. 10007254.5 EP filed Jul. 14, 2010. All of the applications are incorporated by reference herein in their entirety.

TECHNICAL FIELD

The present invention relates to the technical field of producing components by means of a casting procedure. The component may be a structural component of a wind turbine such as a blade of a wind turbine. In particular, the present invention relates to a negative mold for casting a component and to a method for producing a negative mold for casting a component.

BACKGROUND

A blade for a rotor of a wind turbine is typically produced by means of a casting procedure. The casting procedure for a new type of wind turbine blade comprises (a) producing a positive mold representing a design model of the blade which is supposed to be produced, (b) producing a negative mold representing negative copy of the positive mold and (c) producing the blade by casting an appropriate blade material into the negative mold. Thereby, each step has to be finished before starting the next step.

In this document a positive mold is also denominated as a male mold, a positive form and/or a plug. A negative mold is also denominated as a female mold, a negative form and/or a casting mold.

The positive mold respectively the plug is typically produced by means of a milling process, which is accomplished by means of a large Computer Numerical Controlled (CNC) milling machine. Thereby, due to material properties a sub-frame for the positive mold is required having the general geometrical shape of the positive mold. On the sub-frame softer composite material layers are laid down between harder curable materials like fiberglass. The softer composite material layers can be processed by a milling procedure. Because of the large dimension of the positive mold such a milling process lasts typically 8 to 10 weeks.

US 2009/0084932 A1 discloses a negative mold for casting a wind turbine blade. The negative mold comprises a plurality of spaced-apart joists, wherein each joist has an edge configuration generally corresponding to a form of the blade. The negative mold further comprises a flexible frame, supported by the edges of the joists, for shaping an exterior surface of the blade. On the flexible frame there are formed different coatings layers. (A) A first coating layer includes a rigid, semi-rigid, and/or flexible spray foam, such as a polyurethane foam. Such low density, expanding materials for the first coating (a) will fill any openings in the flexible frame, (b) provide improved structural rigidity with little increase in weight and (c) are relatively easy to machine. Once the first coating layer is applied and cured, the surface of the first layer may be cut, ground, sanded and/or otherwise formed to a shape that more-closely corresponds to the intended external shape of the blade. In particular, the first layer may be machined with computer-controlled equipment so as to provide exactly the desired shape. (B) A second coating layer may be applied as a protective layer of higher density material, such as filled or unfilled plastic resins. In addition to enhancing durability of the negative mold, the second coating layer also provides a smooth surface against which to form the blade.

When using the negative mold disclosed in US 2009/0084932 A1 for producing a wind turbine blade it is not necessary to produce a positive mold first. The disclosed negative mold can be produced directly based on three dimensional data representing the geometry of the wind turbine blade which is supposed to be casted. However, the disclosed negative mold has the disadvantage that building up the negative mold is a rather elaborate procedure.

There may be a need for a negative mold for casting a component such as a wind turbine blade, wherein the negative mold can be build up in an easy and effective manner.

SUMMARY

This need may be met by the subject matter according to the independent claims. Advantageous embodiments of the present invention are described by the dependent claims. According to a first aspect of the invention there is provided a negative mold for casting a component, in particular for casting a blade of a wind turbine. The provided negative mold comprises (a) a support structure and (b) a plurality of foam blocks, which are mounted to the support structure in such a manner, that a common surface contour of the plurality of foam blocks defines an outer surface of the component, which is supposed to be casted. Each foam block of the plurality of foam blocks is taken from a predetermined number of different types of foam blocks, whereby each type of foam block is defined by a predetermined foam block size and foam block shape.

The described negative mold is based on the idea that for building up the negative mold it is not necessary to use individually shaped foam blocks, which are adapted to the geometry of the component, which is supposed to be casted. According to the invention the foam blocks are rather selected from a limited number of standardized foam block types, which are defined with respect to their geometry respectively with respect to their size and shape. This may provide the advantage that when building up the described negative mold one has to store only a limited number of different types of foam blocks which makes the casting of the component very effective.

Generally speaking, the described negative mold is build up in a modular way, wherein each module is taken from the limited number of different types of foam blocks.

The support structure may be a frame and in particular a metal frame. The foam blocks may be mounted or attached to the support structure for instance by using an appropriate glue.

According to an embodiment of the invention the predetermined number is not exceeding the number eight, in particular not exceeding the number five and preferably not exceeding the number three. This may provide the advantage that the negative mold can be produced in a very efficient manner. Generally speaking, the smaller the predetermined number is, the larger is the efficiency in particular with respect to the effort for storing or repositing the foam blocks before assembling them together at the support structure.

For instance if the casted component is a blade of a wind turbine it is considered that the number of different shaped foam blocks can be limited to 3, 4 or 5.

According to a further embodiment of the invention each foam block comprises at least one lateral side surface having a three dimensional contour, whereby adjoining lateral side surfaces of different foam blocks have complementary contours. This may provide the advantage that the foam blocks can be arranged next to each other with a close connection and a minimum gap in between two neighboring foam blocks.

The contour may have any arbitrary three dimensional shape. A first contour may be for instance a protrusion and a second complementary contour may be for instance a recess. According to a further embodiment of the invention a first three dimensional contour comprise a convex geometry and a second three dimensional contour comprises a complementary concave contour.

The convex and/or the concave geometry may be for instance a section of a cylinder. This means that in a cross sectional view of the respective foam block the convex respectively the concave geometry appears as a section of a circle. Preferably, the convex respectively the concave geometry appears as a half circle. This may provide the advantage that the three dimensional contours can be easily formed. Further, a very close connection or a minimal gap between neighboring foam blocks can be realized.

According to a further embodiment of the invention at least one foam block of the plurality of foam blocks is a cut foam block, which has been produced by cutting a foam block, which is of a type of one of the predetermined number of different types of foam blocks. This may provide the advantage that the geometry of the negative mold can be easily adapted to the geometry of the component to be casted. Thereby, it is not necessary to increase the predetermined number of different types of foam blocks in order to realize a precise adaptation of the geometry of the negative mold to the component to be casted. According to a further embodiment of the invention the negative mold further comprises a plurality of foam pieces, wherein in a cross sectional view of the negative mold a first foam piece is located at one end of the negative mold and a second foam piece is located at an opposing other end of the negative mold. Thereby, the foam pieces are made from a foam material having a density, which is larger than the density of the foam material being used for the foam blocks. This may provide the advantage that the end foam pieces of the negative mold are mechanically more stable than the middle foam blocks. As a result, the end foam pieces may serve as a mounting structure, which are used for mounting the negative mold to the support structure.

The foam pieces may have the shape of a flange, which has the advantage that a mounting of the foam pieces to the support structure is facilitated.

The foam material being used for the foam blocks may have a density within the range between 250 kg/m3 and 400 kg/m3. By contrast thereto, the foam material being used for the foam pieces may have a density within the range between 500 kg/m3 and 700 kg/m3. In particular, the foam material being used for the foam pieces may have a density of approximately 600 kg/m3.

Apart from having a smaller weight a reduced density of the foam blocks may further have the advantage that a surface finishing of the foam blocks and in particular a milling of the foam blocks will be facilitated.

According to a further embodiment of the invention the common surface contour has been generated by a finishing procedure, which comprises a milling of at least some of the foam blocks. This may provide the advantage that excess foam material is removed easily leaving a precisely shaped common surface contour.

The milling may have been carried out with a milling machine, in particular a Computer Numerical Controlled (CNC) milling machine. Thereby, the milling procedure may be based on three dimensional data of the negative mold. The negative mold or at least portion(s) of the negative mold can be milled directly with a CNC milling machine having a large gantry, a large track and/or a large robotic arm. This may be in particular advantageous if the component to be casted is a very large component such as a blade of a wind turbine.

By directly milling the negative mold a time consuming, elaborate and costly process of producing a positive mold of the component being supposed to be casted can be completely omitted.

According to a further embodiment of the invention the finishing procedure comprises a forming a surface layer on the milled common surface contour. This may provide the advantage that even small cracks and/or pores, which may be still present within the milled common surface contour, can be filled. The surface layer can be applied or formed for instance by spraying a surface layer onto the common surface contour.

The surface layer may comprise at least one of the group of (a) a semi-permanent release agent, (b) Teflon and (c) a plastic bag material such as polypropylene or any other thermoplastic material. This may provide the advantage that in the casting process the negative mold and the casted component are separated from each other. Hence, there is no direct contact between the negative mold and the casting such that there is no requirement to prepare a special inner surface of the negative mold. The described surface layer may further provide the advantage that after a casting has been finished the casted wind turbine blade can be easily removed from the negative mold.

Compared to a known release agent the semi-permanent release agent has the advantage that it will stay within the negative mold or on the inner surface of the negative mold at least for some castings. Therefore, a plurality of castings can be made before new semi-permanent release agent has to be added in order to replace the in the meantime consumed semi-permanent release agent.

In this respect it is mentioned that on top of the surface layer it is of course possible to apply a usual release agent. Such a release agent may further contribute that after a finished casting process the casted wind turbine blade can be easily removed from the negative mold.

The surface layer may be applied on the synthetic material representing the mold surface for instance by means of a coating spray and/or a powder coating of e.g. Teflon. A spray material being used for coating the mold may fuse to the casting at the correct temperature. It is mentioned that also other appropriate materials for coating the mold may be used. According to a further embodiment of the invention the foam blocks are made out of a material, which is dimensionally stable up to a temperature of at least 100° C., preferably up to a temperature of at least 120° C. and in particular up to a temperature of at least 140° C. This may provide the advantage that a variety of new processes and procedures become available for producing a negative mold for casting a wind turbine blade.

According to a further embodiment of the invention the material comprises at least one of (a) a pourable epoxy foam, (b) a polyurethane foam, (c) a glass foam, (d) a high temperature resin, and/or (e) a thermoplastic material.

The material, in particular the pourable epoxy foam can be directly casted into a block shape. Thereby, the mold may be build up from a plurality of different blocks, which are spatially arranged to each other in a manner, which is defined by the shape of the wind turbine blade. The blocks may be made in particular by cutting larger forms of extruded material into an appropriate block shape. When using the described material having a high dimensional stability up to temperatures greater than 100° C., tensions within the block material and later within the whole mold can be significantly reduced.

Using appropriate shaped blocks for building up the mold may provide the advantage that the above mentioned milling can be performed easily.

It is mentioned that when using the described temperature stable material a variety of different processes will become available when the mold is capable of sustaining temperatures greater than at least 100° C.

According to a further aspect of the invention there is provided a method for producing a negative mold for casting a component, which is in particular a blade of a wind turbine. The provided method comprises (a) providing a support structure, (b) mounting a plurality of foam blocks to the support structure in such a manner, that a common surface contour of the plurality of foam blocks defines an outer surface of the component, which is supposed to be casted. Each foam block of the plurality of foam blocks is taken from a predetermined number of different types of foam blocks, whereby each type of foam block is defined by a predetermined foam block size and foam block shape.

Also the described method is based on the idea that for building up the negative mold a modular construction kit can be used, which comprises a limited number of standardized foam block types, which are defined with respect to their geometry respectively with respect to their size and shape. When building up the described negative mold one has to store only a limited number of different types of foam blocks which makes the casting of the component very effective.

According to an embodiment of the invention the method further comprises, before mounting the plurality of foam blocks to the support structure, arranging the plurality of foam blocks in a preordered manner, wherein foam blocks of one and the same type are stored in one and the same storing region. This may provide the advantage that a workman who is mounting the foam blocks to the support structure can work in a proper, orderly and/or uncluttered environment. In particular, when an external supplier is used for providing the foam blocks the respective foam blocks can be delivered already by the external supplier to the respective storing region.

In other words, the preordered arrangement of the foam blocks makes the work for a workman very easy. In particular an installation of appropriate foam pieces to the support structure and/or a trimming of the edges between different foam blocks can be carried out by using traditional handwork techniques.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered as to be disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

BRIEF DESCRIPTION OF THE DRAWINGS

FIG. 1b shows different types of foam blocks, which are used for building up the negative mold shown in FIG. 1a.

DETAILED DESCRIPTION

Figure 1A:
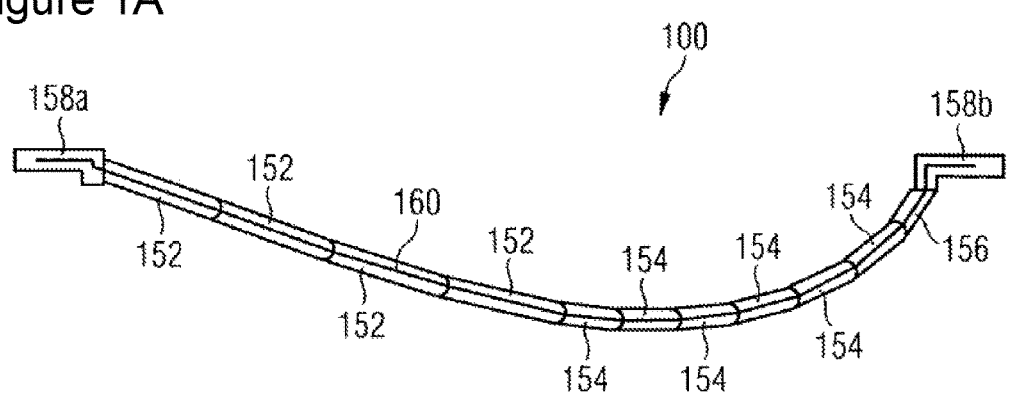
FIG. 1a shows in a cross sectional view a negative mold for casting a wind turbine blade, wherein the negative mold comprises a plurality of foam blocks, which are taken from a predetermined limited number of different types of foam blocks.

The illustration in the drawing is schematically. It is noted that in different figures, similar or identical elements are provided with the same reference signs or with reference signs, which are different from the corresponding reference signs only within the first digit.

FIG. 1a shows in a cross sectional view a negative mold 100 for casting a wind turbine blade. The negative mold 100 has been built on a support structure or frame, which for the sake of clarity is not depicted in FIG. 1a. The negative mold 100 comprises a plurality of foam blocks. According to the embodiment described here each foam block is either a foam block 152 of a first type, a foam block 154 of a second type or a foam block of a third type 158a, 158b. In addition, the negative mold comprises a cut foam block 156, which has been produced by cutting off a portion of a foam block of the first type.

Compared to the inner foam blocks 152, 154b and 156 the outer foam blocks 158a, 158b have to sustain a larger mechanical load. Therefore, according to the embodiment described here the outer foam blocks 158a and 158b are made from a foam material, which has a larger density than the foam material being used for the inner foam blocks 152, 154 and 156. In this document the outer foam blocks 158a and 158b, which are denominated foam pieces or foam end pieces, are made from a foam material having a density 600 kg/m3. By contrast thereto, the inner foam blocks 152, 154 and 156 are made from a material having a density between 250 kg/m3 and 400 kg/m3.

Figure 1B:
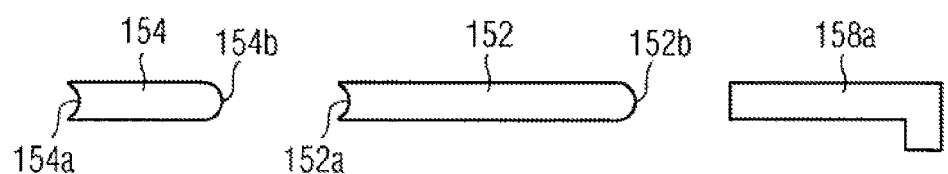

When producing the negative mold 100 all the foam blocks and foam end pieces are placed onto the non depicted frame in an appropriate manner. Thereby, the foam blocks and foam end pieces are connected to each other in such a manner, that complementary three dimensional contours of the lateral side surfaces adjoin each other. Specifically, as can be seen from FIG. 1b, a foam block 152 comprises a first lateral side surface 152a having a concave shape and an opposing second lateral side surface 152b having a convex shape. Accordingly, a foam block 154 comprises a first lateral side surface 154a having a concave shape and an opposing second lateral side surface 154b having a convex shape.

After having placed all foam blocks and foam end pieces at the frame a milling procure is started for finishing the surface of the negative mold 100. Thereby, all material, which is located above a common surface contour 160, is milled away. By employing the described milling procedure a common surface contour 160 can be obtained, which is very even or flat and which precisely matches to the outer surface of the component, which is supposed to be casted within the negative mold 100.

It is mentioned that after the described milling also other finishing procedures can be applied, which may further improve the surface quality for the negative mold 100. More details will be given below with reference to FIGS. 2a and 2b.

In this respect it is mentioned that FIG. 1a does not show a cross section of a complete negative mold. FIG. 1a only shows a lower half 100 of a negative mold for casting a blade of a wind turbine. Thereby, the longitudinal extension (from the root to the tip) of the blade is orientated perpendicular to the plane of drawing of FIG. 1a.

Figure 2A:
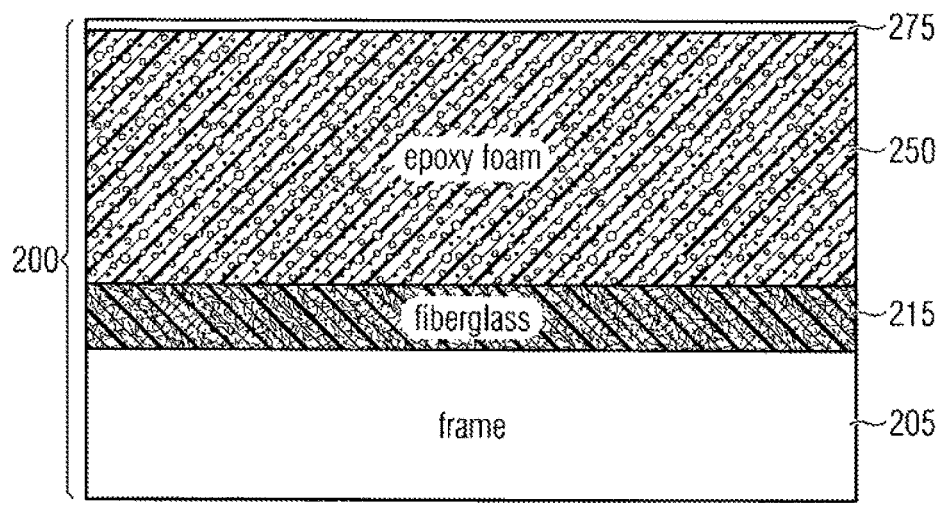
FIG. 2a shows a sectional view of a portion of a negative mold in accordance with a first embodiment of the invention.

FIG. 2a shows in an enlarged sectional view a portion of the negative mold 100, which is now denominated with reference numeral 200. The negative mould 200 comprises a frame structure 205, which is made from metal and which already has the basic shape of the negative mold 200. On top or above the frame structure 205 there is formed a fiberglass layer 215.

The fiberglass layer 215 comprises a composite material being able to withstand high temperatures, which might occur during a casting process. On top or above the fiberglass layer 215 there is formed an epoxy foam 250, which according to the embodiment described here is a high density and high temperature epoxy foam having a density between 250 kg/m3 or 400 kg/m3. As has already been mentioned above, the precisely shaped upper surface of the epoxy foam 250 has been generated by means of a surface finish 275, which has been accomplished by a precise milling procedure of the epoxy foam 250.

It is mentioned that optionally one or more epoxy layers may be introduced below or instead of the surface finish 275. Such epoxy layers may provide a seal for the negative mold. This may prevent humidity from entering the negative mold. Therefore, unwanted humidity induced contractions or expansions of the negative mold can be effectively avoided.

It is further mentioned that on the surface finish 275 or on the epoxy foam (instead of the surface finish) there may be applied a semi-permanent release agent, which will stay within the negative mold and/or on the inner surface of the negative mold at least for some castings. The semi-permanent release agent may allow that a plurality of castings can be made before a new semi-permanent release agent has to be added in order to replace in the meantime consumed semi-permanent release agent.

The semi-permanent release agent may be for instance a water based semi-permanent release agent or a solvent based semi-permanent release agent. Preferably, a water based semi-permanent release agent is used because it may be non toxic and/or may allow for an easy handling without the need for specific handling equipment.

Furthermore, it is mentioned that on the surface finish 275 or instead of the surface finish 275 a Teflon layer or a plastic bag material such as polypropylene may be formed. According to the embodiment described here a temporary mold the epoxy foam blocks 152, 154 and 156 (see FIG. 1a), which have been precast to the correct height and form, are glued onto the fiberglass layer 215. The epoxy foam is then poured over the surface and then covered with a stiff yet flexible material such as polypropylene. The foam then expands to the correct height and the flexible portions of the negative mold can be removed.

In the following there will be mentioned some treatments which are also possible in order to realize a smooth inner surface of the common surface contour of the negative mold:
(a) One or several sprayed epoxy layer(s) can be sanded in between different coatings.
(b) A layer of epoxy can be rolled on by hand and can be distributed by a silicon leveling tool.
(c) Coating the inner surface by using a spray gel.

As has already been mentioned above, on top of this smooth inner surface a semi-permanent release agent may be applied followed optionally by a Teflon layer.

Another method in order to realize a smooth inner surface of the negative mold is to simply use a "plastic bag" directly on top of the epoxy foam. The "plastic bag method" may be realized by a continuous sheet of polypropylene or some other thermoplastic, which is placed on the inner surface of the negative mold. In this case there will be no direct contact between the negative mold and the casting (i.e. the casted wind turbine blade) such that no special surface treatment is required.

In the following a possible process for realizing the negative mold 200 will be described (work description):
  In a first step the frame 205 is prepared with a surface having approximately the same shape as the finished negative mold, minus the expected thicknesses of the epoxy foam 250 and the fiberglass layer 215.
  In a second step the fiberglass layer 215 is added on top of the frame 205.
  In a third step the epoxy foam 250 (poured in appropriate blocks) are glued onto the fiberglass layer 215.
  In a fourth step the epoxy foam 250 is milled into the correct and final shape.

Figure 2B:
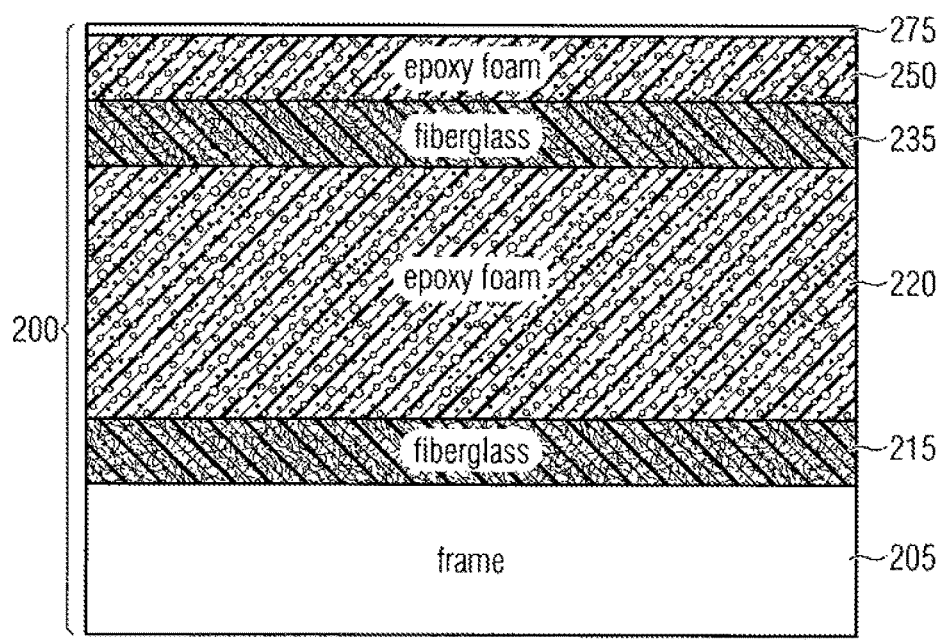
FIG. 2b shows a sectional view of a portion of a negative mold in accordance with a second embodiment of the invention.

FIG. 2b shows in an enlarged sectional view a negative mold 200 according to a second embodiment of the invention. In accordance with the negative mold 200 shown is FIG. 2a, the negative mold 200 also comprises a (metal) frame 205, a fiberglass layer 215 formed on the frame 205 and an epoxy foam 250.

However in contrast to the negative mold 200 shown in FIG. 2a the negative mold 200 respectively the foam blocks of the negative mold 200 comprise additionally a further layer of epoxy foam 220 and a further fiberglass layer 235 formed on the epoxy foam 220. The additional epoxy foam layer 220 and the additional fiberglass layer 235 may provide the advantage that additional stability may be provided to the structure of the negative mold 200 shown in FIG. 2b. Because of the provision of the further fiberglass layer 235 the final negative mold 200 will be able to withstand an increased number of castings.

In the following there will be described some advantages, which result from using the negative molds 100, 200 described in this document.
(A) By using a directly milled negative mold which makes the traditional procedure of forming a positive mold respectively a plug superfluous, a new wind turbine blade can be casted and can be ready for testing in approximately half the time which is required to traditionally produce (a prototype of) a wind turbine blade.
(B) Casting a blade in a directly milled negative mold produces a mold geometry that closer matches the original. Further, the angles of a negative mold can be milled more precisely than that of a positive mold, because the milling head of a milling machine has more clearance. This results in less hand finishing of the geometry of the negative mold.

(C) The negative mold may by a high temperature negative mold which is capable of withstanding approximately twice the temperature which a traditionally produced negative mold is able to sustain.

(D) The production of the directly produced negative mold is precisely repeatable by a recreation of a file including 3D data.

(E) Compared to the traditional process for producing a negative mold the described single step production process of the negative mold saves time and money.

(F) There is no need for a special storage of a positive mold.

(G) All components of the described negative mold are resistant to moisture.

(H) The directly produced negative mold can be realized with a simplified composite layer using only few raw materials.

(I) In a curing process only a very small mechanical tension occurs within the negative mold in particular if the above described materials are used. Therefore, a simplified frame structure can be used.

Last but not least it is mentioned that negative molds that are worn out can easily be refurbished to the exact geometry by milling down the upper surface and pour out new layer of epoxy foam. This is a great improvement compared to prior art negative molds where one need to start from the bottom by building up a new negative mold by casting, wherein in the beginning a positive mold respectively a plug has to be used.

It should be noted that the term "comprising" does not exclude other elements or steps and the use of articles "a" or "an" does not exclude a plurality. Also elements described in association with different embodiments may be combined. It should also be noted that reference signs in the claims should not be construed as limiting the scope of the claims.

LIST OF REFERENCE SIGNS 100 negative mold (lower half)
152 foam block (first type)
152a lateral side surface/concave shape
152b lateral side surface/convex shape
154 foam block (second type)
154a lateral side surface/concave shape
154b lateral side surface/convex shape
156 cut foam block
158a foam end piece (third type)
158b foam end piece (third type)
160 common surface contour
200 negative mold
205 frame
215 fiberglass layer
220 epoxy foam
235 fiberglass layer
250 epoxy foam
275 surface finish

The invention claimed is:

1. A method for producing a negative mold for casting a blade of a wind turbine component, comprising:
providing a support structure; and
adjacently mounting a plurality of foam blocks onto the support structure such that a common surface contour of the plurality of foam blocks defines an outer surface of the wind turbine component, which is to be casted; and
wherein each foam block is taken from a predetermined number of different types of foam blocks, each of the different types of foam block is defined by a predetermined foam block size and foam block shape,
wherein each of the mounted foam blocks comprises at least one three-dimensionally contoured lateral surface, mated with complementary three-dimensionally contoured lateral surface of the adjacently mounted block.

2. The method as set forth in claim 1, further comprising generating the common surface contour by a finishing procedure, which comprises a milling of at least some of the foam blocks.

3. The method as set forth in claim 2, wherein the finishing procedure further comprises a forming a surface layer on the milled common surface contour.

4. The method as set forth in claim 1, wherein each of the foam blocks are formed from a material dimensionally stable up to a temperature of at least 140° C.

5. The method as set forth in claim 4, wherein the material comprises at least one of
a pourable epoxy foam,
a polyurethane foam,
a glass foam,
a high temperature resin, or
a thermoplastic material.

6. The method as set forth in claim 1, further comprising storing the plurality of foam blocks in a preordered manner such that foam blocks of one and the same type are stored in a same storing region before the mounting of the plurality of foam blocks to the support structure.

7. The method as set forth in claim 1,
wherein the support structure has the basic shape of the negative mold.

8. The method as set forth in claim 1,
wherein the predetermined number number of different types of foam blocks does not exceed 5.

9. The method as set forth in claim 8,
wherein the predetermined number number of different types of foam blocks does not exceed 4.

10. The method as set forth in claim 9,
wherein the predetermined number number of different types of foam blocks does not exceed 3.

11. The method as set forth in claim 1,
wherein foam blocks are mounted to the support structure via glue.

12. The method as set forth in claim 2, wherein each of the foam blocks are formed from a material dimensionally stable up to a temperature of at least 140° C.

13. The method as set forth in claim 12, wherein the material comprises at least one of
a pourable epoxy foam,
a polyurethane foam,
a glass foam,
a high temperature resin, or
a thermoplastic material.

14. The method as set forth in claim 2, further comprising storing the plurality of foam blocks in a preordered manner such that foam blocks of one and the same type are stored in a same storing region before the mounting of the plurality of foam blocks to the support structure.

15. The method as set forth in claim 2,
wherein the support structure has the basic shape of the negative mold.

16. The method as set forth in claim 2,
wherein the predetermined number number of different types of foam blocks does not exceed 5.

17. The method as set forth in claim 16,
wherein the predetermined number number of different types of foam blocks does not exceed 4.
18. The method as set forth in claim 17,
wherein the predetermined number number of different types of foam blocks does not exceed 3.
19. The method as set forth in claim 2,
wherein foam blocks are mounted to the support structure via glue.
20. The method as set forth in claim 15,
wherein the support structure metal.

\* \* \* \* \*